C. E. WILSON.
Plow.
No. 82,189. Patented Sept. 15, 1868.
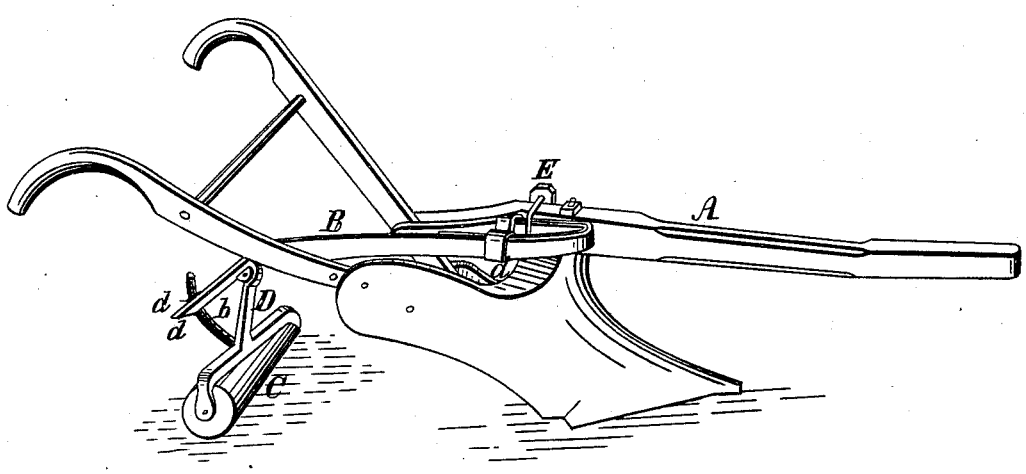
Witnesses:
Alfred Deering
Atkinson Hobart
Inventor:
Charles E. Wilson

CHARLES E. WILSON, OF PALMYRA, ASSIGNOR TO HIMSELF, PUTNAM WILSON, JR., AND PHILIP WILSON, OF EAST NEWPORT, MAINE.

Letters Patent No. 82,189, dated September 15, 1868.

IMPROVEMENT IN ATTACHMENT FOR PLOWS.

The Schedule referred to in these Letters Patent and making part of the same.

*To all whom it may concern:*

Be it known that I, CHARLES E. WILSON, of Palmyra, in the county of Somerset, and State of Maine, have invented a new and useful attachment for plows, which I term a "Plow-Follower;" and I do hereby declare that the following is a full and exact description thereof, which will enable others skilled in the art to make and use my invention, reference being had to the accompanying drawings, and to the letters of reference marked thereon.

The drawings represent, in perspective, an ordinary plow, to which is attached my invention. In said drawings—

A is the beam of the plow.
B, the bent spring of my attachment.
C, the conical roller.
D, the roller-head.
E, the clamp.

I will now proceed to describe the construction and operation of my invention.

I construct of steel, or other suitable material, the bent spring B. The spring is formed of two or more parts, as shown in the drawings. The different parts of the short arm are united at the extremity by bolts or otherwise, and the long arms are held together by the band $a$. The spring B is twisted near the posterior end of the long arm, so that the flat side thereof is bent towards the ground, and is provided with two spurs, to which the arm of the roller-head is pivoted as shown in the drawings.

I construct the roller-head D of malleable iron or other suitable material, and pivot the same to the spring B, as before described.

I provide the roller-head with the bent screw $b$, one end of which passes through a slot in the spring B, and furnish the screw $b$ with adjusting-nuts $d\ d$, as shown in the drawings.

I construct the conical roller C of wood or other suitable material, and secure the same in the roller-head by a pivot, upon which it freely revolves.

I provide the movable clamp E, or two clamps, or other suitable contrivance, to secure the follower to the plow, as shown in the drawings.

When attached, the follower is clamped to the beam of the plow by the clamp E, on the short arm of the spring B, and the long arm of the spring rests on the rod or tie $e$, between the handles of the plow, in such position as to bring the roller C just behind the tail of the mould-board. The roller projects sideways beyond the mould-board, as shown in the drawings. The roller is then adjusted for deep or shallow plowing, or according to the character of the ground, by means of the bent screw $b$ and nuts $d\ d$.

In operation, as the plow is drawn forward, and the furrow turned, the roller following the mould-board, rolls over and compresses the furrow, turning the earth completely over, and smoothing the ridge, so that the earth cannot fall back into the trench.

When, however, the roller strikes against a rock, stump, or other obstruction which it cannot overcome, the spring B, which has considerable lateral play, is deflected until the obstacle is passed.

Having made and tested several of my "plow-followers" in various soils, and attached to ordinary plows, I find the same especially effective in turning the turf in plowing grass-land, and in forming a perfect furrow on hill-sides, where, from the character of the ground, without my follower, the earth fell at once back into the trench.

My invention is cheap, durable, simple, not likely to get out of order, can be attached in a few moments to any ordinary plow, and as readily removed when desired.

What I claim as my invention, and desire to secure by Letters Patent, is—

The spring B, adjustable roller-head D, and roller C, as an attachment for a plow, all constructed and operating substantially in the manner and for the purposes shown and described.

CHARLES E. WILSON.

Witnesses:
ALPHEUS A. DEERING,
ATKINSON HOBART.